United States Patent
Riordan et al.

(10) Patent No.: US 8,960,051 B2
(45) Date of Patent: Feb. 24, 2015

(54) COMBINED HUB, COUNTERWEIGHT AND CRANK ARM WITH SINGLE PIECE STEEL BODY

(75) Inventors: Conor Riordan, Grand Rapids, MI (US); David G. Bannon, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 96 days.

(21) Appl. No.: 13/599,048

(22) Filed: Aug. 30, 2012

(65) Prior Publication Data

US 2014/0060240 A1    Mar. 6, 2014

(51) Int. Cl.
*F16C 3/04* (2006.01)

(52) U.S. Cl.
USPC ................................................ 74/603

(58) Field of Classification Search
CPC .......... B64D 41/007; F01D 17/00; F02C 7/32
USPC .............. 74/595, 602, 603, 604; 416/51, 137, 416/144, 145
See application file for complete search history.

(56) References Cited

U.S. PATENT DOCUMENTS

| | | | | |
|---|---|---|---|---|
| 3,013,613 | A * | 12/1961 | Blackburn | 416/50 |
| 4,993,865 | A * | 2/1991 | Nagashima | 403/358 |
| 5,101,683 | A * | 4/1992 | Pfennig | 74/595 |
| 5,257,907 | A * | 11/1993 | Seidel | 416/137 |
| 6,317,048 | B1 | 11/2001 | Bomya | |
| 7,178,501 | B2 * | 2/2007 | Schmidt et al. | 123/197.1 |
| 8,066,096 | B1 | 11/2011 | Francisco | |
| 8,066,481 | B2 * | 11/2011 | Bannon | 416/51 |
| 8,206,259 | B2 | 6/2012 | Lang | |
| 8,299,883 | B2 | 10/2012 | Katsumata | |
| 8,357,070 | B2 | 1/2013 | Duong | |
| 8,643,213 | B2 | 2/2014 | Swearingen | |
| 2011/0036334 | A1 * | 2/2011 | De Gooijer | 123/568.14 |

* cited by examiner

Primary Examiner — Thomas R. Hannon
Assistant Examiner — Adam D Rogers
(74) Attorney, Agent, or Firm — Stephen G. Mican

(57) ABSTRACT

A combination hub, counterweight and crank arm for a governor assembly in a ram air turbine is has a hub section with a cylindrical orifice, an annular collar section that surround the hub section, a counterweight section that extends out of the annular collar section and a crank arm section that extends out of the annular collar section, with all the sections formed in a single piece steel body.

19 Claims, 1 Drawing Sheet

COMBINED HUB, COUNTERWEIGHT AND CRANK ARM WITH SINGLE PIECE STEEL BODY

Figure 1:
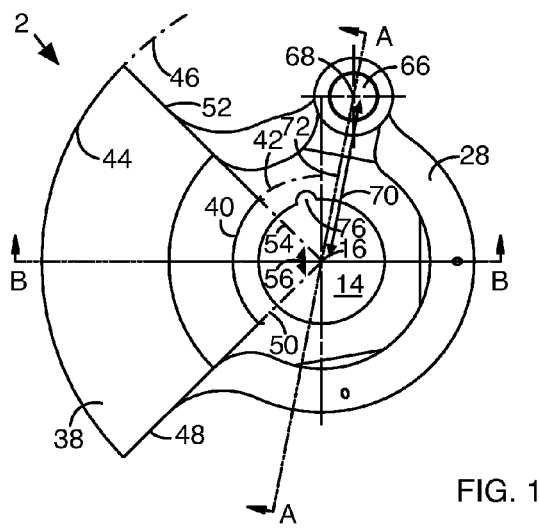
FIG. 1 is a top view of a single piece steel body according to a possible embodiment that serves as a combination hub, counterweight and crank arm for a governor assembly in a ram air turbine.
Figure 2:
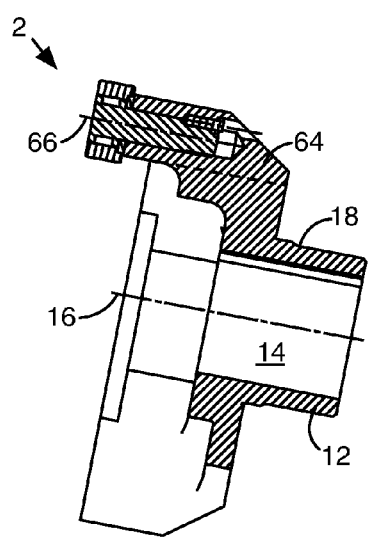
FIG. 2 is a first cut-away side view of the single piece steel body shown in FIG. 1 along sectional line A-A.
Figure 3:
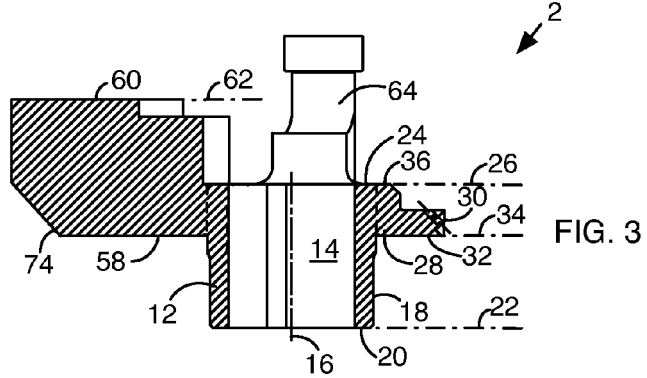
FIG. 3 is a second cut-away side view of the single piece steel body shown in FIG. 1 along sectional line B-B.
Figure 4:
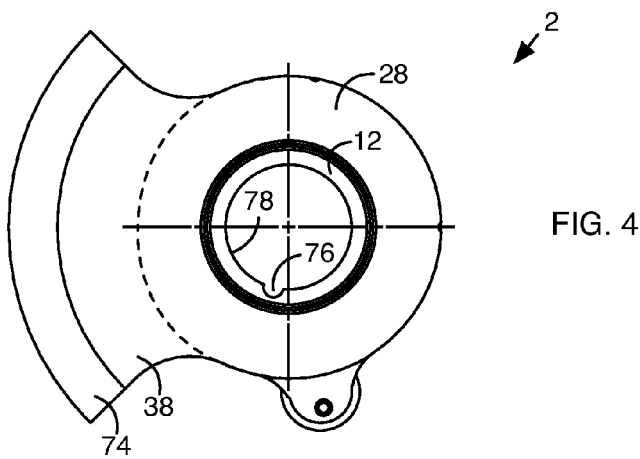
FIG. 4 is a bottom view of the single piece steel body shown in FIG. 1.

Referring to FIGS. 1 through 4 together, a single piece steel body 2 according to a possible embodiment serves as a combination hub, counterweight and crank arm for a governor assembly in a ram air turbine. The single piece steel body 2 has a generally annular hub section 12 with a generally cylindrical hub orifice 14 passing there through. The hub orifice 14 has an axis of rotation 16. The hub section 12 has an outer surface 18 that extends from a surface 20 along a first radial plane 22 to a surface 24 along a second radial plane 26, the first radial plane 22 and the second radial plane 26 being generally normal to the hub orifice axis of rotation 16.

The single piece steel body 2 has a generally annular collar section 28 with an outer surface 30. The collar section 28 surrounds the hub section 12 between a surface 32 along a third radial plane 34 that is generally normal to the hub orifice axis of rotation 16 and a surface 36 along the second radial plane 26, the third radial plane 34 closer to the second radial plane 26 than the first radial plane 22.

The single piece steel body 2 has a counterweight section 38 that extends radially out of the collar section 28 in the general form of a ring segment between a surface 40 along a first surface of revolution 42 about the hub orifice axis of rotation 16, which first surface of revolution 42 has a diameter larger than the hub section 12, and a surface 44 along a second surface of revolution 46 about the hub orifice axis of rotation 16. The counterweight section 38 extends circumferentially about the collar section 28 from a surface 48 along a first axial plane 50 to a surface 52 along a second axial plane 54, the first axial plane 50 and the second axial plane 54 both intersecting the hub orifice axis of rotation 16 and separated from each other by a desired angle 56. The counterweight section 38 extends axially from a surface 58 along the third radial plane 34 to a surface 60 along a fourth radial plane 62 farther from the first radial plane 22 than the second radial plane 26.

The single piece steel body 2 has a crank arm section 64 that extends radially out of the collar section 28 in the general form of a closed cylinder, with a cylindrical bore 66 therein. The cylindrical bore 66 in the crank arm section 64 has an axis of rotation 68 generally parallel to the hub axis of rotation 16 and displaced from the hub axis of rotation 16 by a desired distance 70 along a third axial plane 72 that intersects the hub axis of rotation 16.

The counterweight section may additionally have a beveled surface 74. The surface 74 may intersect a portion of the surface 44 along the second surface of revolution 46 and the surface 52 along the second third radial plane 34. The hub section 12 may additionally have a keyway 76 in the form of a groove along a surface 78 of the hub orifice 14 that extends along the length of the hub orifice 14.

It is possible to adjust the mass and balance of the single piece steel body 22 by changing the geometries of the described surfaces of the counterweight section. In particular, it is possible to machine at least a portion of the surface 60 of the counterweight section 38 along the fourth radial plane 62 to adjust the mass of the counterweight section 38. It is possible to machine at least a portion of the surface 58 of the counterweight section 38 along the third radial plane 34 to adjust the mass of the counterweight section 38 as well. It is additionally possible to machine the counterweight section 38 to increase the area of the beveled surface 74 to adjust the mass of the counterweight section 38.

It is also possible to machine at least a portion of the surface 48 of the counterweight section 38 along the first axial plane 50 to adjust the mass and balance of the counterweight section 38. Alternately, it is possible to machine at least a portion of the surface 52 of the counterweight section 38 along the second axial plane 54 to adjust the mass and balance of the counterweight section 38.

It is further possible to machine at least a portion of the surface 40 of the counterweight section 38 along the first surface of revolution 42 to adjust the mass of the counterweight section 38. Finally, it is possible to machine at least a portion of the surface 44 of the counterweight section 38 along the second surface of revolution 46 to adjust the mass of the counterweight section 38.

The single piece steel body 2 may comprise any suitable steel, such as a machinable grade of stainless steel. The single piece construction results in a product with decreased cost, increased reliability and enhanced structural robustness compared to a multi-piece product fabricated from multiple materials. The described embodiments as set forth herein represents only some illustrative implementations of the invention as set forth in the attached claims. Changes and substitutions of various details and arrangement thereof are within the scope of the claimed invention.

The invention claimed is:

1. A single piece steel body for a governor assembly in a ram air turbine that comprises:

a hub section that has a cylindrical hub orifice passing therethrough, the hub orifice having an axis of rotation and the hub section extending from a first planar surface along a first radial plane normal to the axis of rotation of the hub orifice to a second planar surface along a second radial plane normal to the axis of rotation of the hub orifice;

an annular collar section that surrounds the hub section between a third planar surface along a third radial plane normal to the axis of rotation and a fourth planar surface along the second radial plane, the third radial plane between the first radial plane and the second radial plane and closer to the second radial plane than the first radial plane;

a counterweight section in the form of a ring segment that extends out of the annular collar section axially between the second radial plane and the third radial plane and radially between a first surface of revolution about the axis of rotation that has a diameter larger than the hub orifice and a second surface of revolution about the axis of rotation of the hub orifice that has a diameter larger than the first surface of revolution, from a fifth planar surface along a first axial plane that includes the axis of rotation of the hub orifice to a sixth planar surface along a second axial plane that includes the axis of rotation of the hub orifice that is displaced from the first axial plane by a desired angle, axially from a seventh planar surface along the third radial plane to an eighth planar surface along a fourth radial plane normal to the axis of rotation of the hub orifice, the fourth radial plane farther from the first radial plane than the second radial plane and radially from a first curvilinear surface along the first surface of revolution to a second curvilinear surface along the second surface of revolution; and a crank arm section that extends out of the annular collar section axially between the second radial plane and the third radial plane in the form of a closed cylinder, with a cylindrical bore therein having an axis of rotation generally parallel to the axis of rotation of the hub orifice, displaced from the axis of rotation of the hub orifice by a desired distance along a third axial plane that includes the axis of rotation of the hub orifice.

2. The single piece steel body of claim 1, wherein at least a portion of the eighth planar surface of the counterweight section along the fourth radial plane is machinable to shift a position of the machined surface closer to the first radial plane to adjust mass of the counterweight section.

3. The single piece steel body of claim 1, wherein at least a portion of the seventh planar surface of the counterweight section along the third radial plane is machinable to shift a position of the machined surface closer to the fourth radial plane to adjust mass of the counterweight section.

4. The single piece steel body of claim 1, wherein at least a portion of the fifth planar surface of the counterweight section along the first axial plane is machinable to shift a position of the machined surface closer to the second axial plane to adjust mass of the counterweight section.

5. The single piece steel body of claim 1, wherein at least a portion of the sixth planar surface of the counterweight section along the second axial plane is machinable to shift a position of the machined surface closer to the first axial plane to adjust mass of the counterweight section.

6. The single piece steel body of claim 1, wherein at least a portion of the fifth planar surface of the counterweight section along the first axial plane and at least a portion of the sixth planar surface of the counterweight section along the second axial plane are both machinable to adjust balance and mass of the counterweight section.

7. The single piece steel body of claim 1, wherein at least a portion of the first curvilinear surface of the counterweight section along the first surface of revolution is machinable to adjust mass of the counterweight section.

8. The single piece steel body of claim 1, wherein at least a portion of the second curvilinear surface of the counterweight section along the second surface of revolution is machinable to adjust mass of the counterweight section.

9. The single piece steel body of claim 1, wherein the intersection of a portion of the second curvilinear surface of the counterweight section along the second surface of revolution in combination with a portion of the seventh planar surface of the counterweight section along the third radial plane is machinable to create a beveled edge to adjust mass of the counterweight section.

10. The single piece steel body of claim 1, wherein the hub section further comprises a keyway in the form of a groove along a surface of the hub orifice that extends along the entire length of the hub orifice.

11. A single piece steel body for a governor assembly in a ram air turbine that comprises:

a hub section that has a cylindrical hub orifice passing therethrough, the hub orifice having an axis of rotation and a keyway in the form of a linear groove along a surface of the hub orifice that extends along the entire length of the hub orifice, the hub section extending from a first planar surface along a first radial plane normal to the axis of rotation of the hub orifice to a second planar surface along a second radial plane normal to the axis of rotation of the hub orifice;

an annular collar section that surrounds the hub section between a third planar surface along a third radial plane normal to the axis of rotation and a fourth planar surface along the second radial plane, the third radial plane between the first radial plane and the second radial plane and closer to the second radial plane than the first radial plane;

a counterweight section in the form of a ring segment that extends out of the annular collar section between a first curvilinear surface along a first surface of revolution about the axis of rotation that has a diameter larger than the hub orifice and a second curvilinear surface along a second surface of revolution about the axis of rotation of the hub orifice that has a diameter larger than the first surface of revolution, from a fifth planar surface along a first axial plane that includes the axis of rotation of the hub orifice to a sixth planar surface along a second axial plane that includes the axis of rotation of the hub orifice that is displaced from the first axial plane by a desired angle, and from a seventh planar surface along the third radial plane to an eighth planar surface along a fourth radial plane normal to the axis of rotation of the hub orifice, the fourth radial plane farther from the first radial plane than the second radial plane and a beveled edge extends along the intersection of at least a portion of the second curvilinear surface of the counterweight section along the second surface of revolution and at least a portion of the seventh planar surface of the counterweight section along the third radial plane; and a crank arm section that extends out of the annular collar section in the form of a closed cylinder, with a cylindrical bore therein having an axis of rotation parallel to the axis of rotation of the hub orifice, displaced from the axis of rotation of the hub orifice by a desired distance along a third axial plane that includes the axis of rotation of the hub orifice.

12. The single piece steel body of claim 11, wherein at least a portion of the eighth planar surface of the counterweight section along the fourth radial plane is machinable to shift a position of the machined surface closer to the first radial plane to adjust mass of the counterweight section.

13. The single piece steel body of claim 11, wherein at least a portion of the seventh planar surface of the counterweight section along the third radial plane is machinable to shift a position of the machined surface closer to the fourth radial plane to adjust mass of the counterweight section.

14. The single piece steel body of claim 11, wherein at least a portion of the fifth planar surface of the counterweight section along the first axial plane is machinable to shift a position of the machined surface closer to the second axial plane to adjust mass of the counterweight section.

15. The single piece steel body of claim 11, wherein at least a portion of the sixth planar surface of the counterweight section along the second axial plane is machinable to shift the position of the machined surface closer to the first axial plane to adjust the mass of the counterweight section.

16. The single piece steel body of claim 11, wherein at least a portion of the fifth planar surface of the counterweight section along the first axial plane and at least a portion of the sixth planar surface of the counterweight section along the second axial plane are both machinable to adjust balance and mass of the counterweight section.

17. The single piece steel body of claim 11, wherein at least a portion of the second curvilinear surface of the counterweight section along the first surface of revolution is machinable to adjust mass of the counterweight section.

18. The single piece steel body of claim 11, wherein at least a portion of the second curvilinear surface along the second surface of revolution of the counterweight section is machinable to adjust mass of the counterweight section.

19. The single piece steel body of claim 11, wherein the beveled edge is machinable to adjust mass of the counterweight section.

* * * * *